(12) United States Patent
Kato et al.

(10) Patent No.: US 6,800,979 B2
(45) Date of Patent: Oct. 5, 2004

(54) BRUSHLESS MOTOR AND ELECTRIC APPLIANCE OR VEHICLE EQUIPPED WITH THE SAME

(75) Inventors: Hisataka Kato, Kadoma (JP); Muneo Yamamoto, Kadoma (JP); Noriyoshi Nishiyama, Izumiotsu (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/381,780

(22) PCT Filed: Aug. 2, 2002

(86) PCT No.: PCT/JP02/07933

§ 371 (c)(1),
(2), (4) Date: Mar. 28, 2003

(87) PCT Pub. No.: WO03/015246

PCT Pub. Date: Feb. 20, 2003

(65) Prior Publication Data

US 2004/0027024 A1 Feb. 12, 2004

(30) Foreign Application Priority Data

Aug. 8, 2001 (JP) ........................................ 2001-240839
Nov. 15, 2001 (JP) ........................................ 2001-349900

(51) Int. Cl.[7] ................................................ H02K 1/00
(52) U.S. Cl. ........................ 310/184; 310/198; 318/254; 318/439
(58) Field of Search ................................ 310/184, 198, 310/67 R; 318/254, 439, 606, 608

(56) References Cited

U.S. PATENT DOCUMENTS

| | | | | |
|---|---|---|---|---|
| 5,006,745 A | * | 4/1991 | Nishio et al. | 310/177 |
| 5,015,903 A | | 5/1991 | Hancock et al. | 310/168 |
| 5,164,622 A | * | 11/1992 | Kordik | 310/67 R |
| 5,675,196 A | | 10/1997 | Huang et al. | 310/67 R |
| 6,255,789 B1 | | 7/2001 | Ochi et al. | 318/254 |
| 6,400,107 B1 | * | 6/2002 | Nakatani et al. | 318/254 |

FOREIGN PATENT DOCUMENTS

| | | |
|---|---|---|
| EP | 0 661 797 A1 | 7/1995 |
| EP | 0 896 423 A2 | 2/1999 |
| EP | 1 083 649 A2 | 3/2001 |
| GB | 2 345 588 A | 7/2000 |
| JP | 62-110468 | 5/1987 |
| JP | 9-285088 | 10/1997 |
| JP | 2000-209829 | 7/2000 |

* cited by examiner

*Primary Examiner*—Dang Le
(74) *Attorney, Agent, or Firm*—Parkhurst & Wendel, L.L.P.

(57) ABSTRACT

The object of the present invention is to provide a low-noise and low-vibration brushless motor and an electric applicance and a vehicle which have the brushless motor and increase in quietness, by optimizing a ratio of the number of poles on a rotor to the number of slots on a stator, the ratio being suitable for a driving circuit. The present invention is a brushless motor constituted by ten-pole rotor (1), a stator (3) having (12) slots (2) and making three-phase connection to the slots (2), and a driving circuit (5) for applying three-phase full-wave current to the stator (3). Further, the conduction width of the driving circuit is set at an electrical angle of 135 to 180°.

9 Claims, 7 Drawing Sheets

BRUSHLESS MOTOR AND ELECTRIC APPLIANCE OR VEHICLE EQUIPPED WITH THE SAME

TECHNICAL FIELD

The present invention relates to a brushless motor which is constituted by a rotor having a plurality of poles, a stator having a plurality of slots and making three-phase connection to the slots, and a driving circuit for applying three-phase full-wave current to the stator, and concerns an electric appliance such as an air conditioner, an air cleaner, and a water heater, or a vehicle that is equipped with the motor.

BACKGROUND ART

Figure 8:
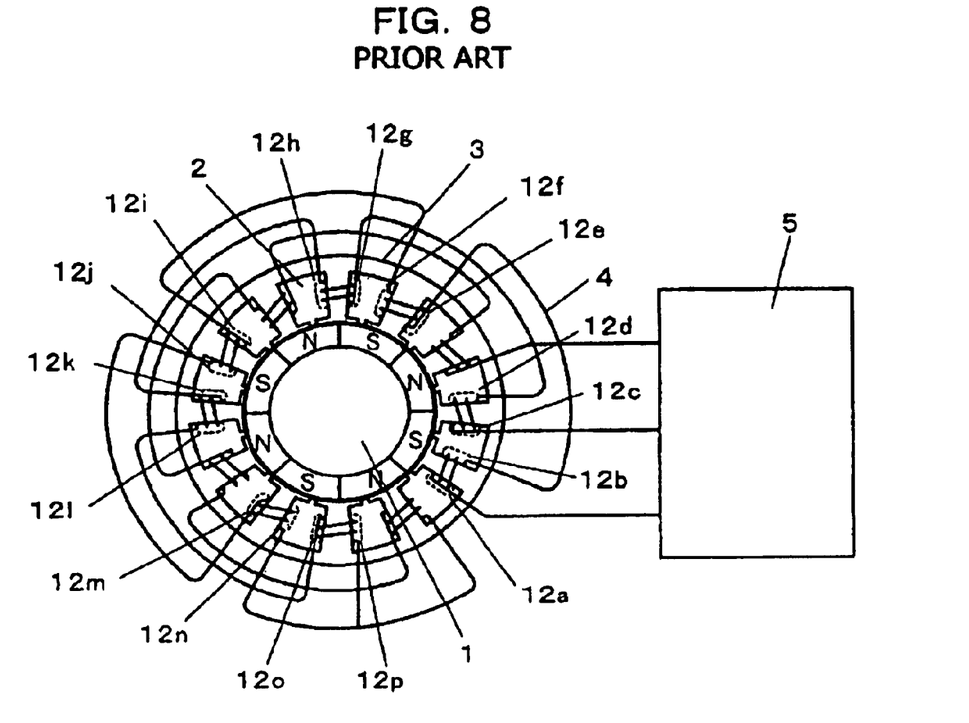
FIG. 8 is a diagram showing a conventional sine-wave driving brushless motor.

In recent years, lower noise and lower vibration of brushless motors have been in increasing demand. As shown in FIG. 8, conventionally, a brushless motor has been constituted by an eight-polar rotor 1, a stator 3 which has twelve slots 2 and making three-phase connection to the slots 2, and a driving circuit 5 which applies 120° three-phase full-wave current to the stator 3. In this way, the ratio of the number of poles on the rotor 1 to the number of slots on the stator 3 has been 2:3.

In general, it is said that when current applied to a winding to reduce torque pulsation is brought close to a sine wave, noise and vibration can be effectively reduced. Since voltage applied to a winding is determined by a difference between a line induced voltage and a power supply voltage, when line induced voltage is closer to a sine wave, noise and vibration can be reduced more effectively.

However, in the conventional brushless motors, line induced voltage has a poor distortion factor, resulting in problems of noise and vibration.

In FIG. 8, voltage $f_8(\theta)$, which is induced by a conductor group 12a on one side of one tooth, is expressed below by Fourier expansion.

$$f_8(\theta) = \sum_{n=1}^{\infty} a_u \sin\{(2n-1)\theta\} \quad \text{(Equation 1)}$$

In the above equation, θ represents an electrical angle (°).

A line induced voltage $f_8(\theta)$ is the sum of voltages induced by conductor groups 12a to 12p and is obtained by adding 16 phase differences of the (equation 1) as shown below.

$$F_8(\theta) = 4f_8(\theta) + 8f_8(\theta + 60°) + 4f_8(\theta + 120°) \quad \text{(Equation 2)}$$

The equation (2) is expressed for each high-frequency component as shown below.

$$F_8(\theta) = 12a_1 \sin(\theta + 60°) + 12a_3 \sin(5\theta + 300°) + 12a_4 \sin(7\theta + 60°) + \quad \text{(Equation 3)}$$

Figure 9:
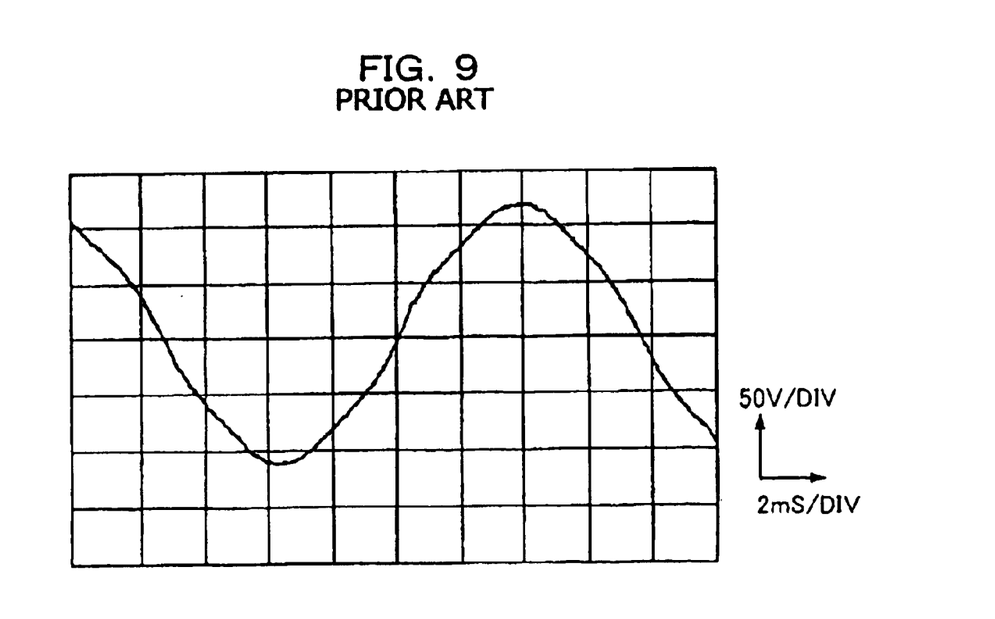
FIG. 9 is a diagram showing a line induced voltage waveform of the conventional sine-wave driving brushless motor.

Hence, when the ratio of the number of poles on the rotor to the number of slots on the stator is 2:3, although tertiary components of line induced voltage can be reduced, quintuple and septenary components cannot be reduced. FIG. 9 shows a line induced voltage waveform at 1000 r/min. Since only a sine wave with a distortion factor of 2 to 5% is obtained, torque pulsation occurs, resulting in problems of low noise and low vibration. Since the 120° three-phase full-wave current-carrying method is adopted, when phases of two-phase current application are switched, current applied to a coil largely fluctuates and torque pulsation occurs, which is a disadvantage against low noise and low vibration.

DISCLOSURE OF INVENTION

The present invention in intended to solve the above-mentioned conventional problem, and has an object to provide a low-noise and low-vibration brushless motor and a more quiet electric appliance and a vehicle that are equipped with the brushless motor, by optimizing a ratio of the number of poles on a rotor to the number of slots on a stator, the ratio being suitable for a driving circuit.

In order to solve the above-mentioned problem, the present invention provides a brushless motor which comprises a rotor having a plurality of poles, a stator having a plurality of slots and making three-phase connection to the slots, and a driving circuit for applying three-phase full-wave current to the stator, the motor being characterized in that the ratio of the number of poles on the rotor to the number of slots on the stator is 10:12, and the conduction width of the driving circuit is set at an electrical angle of 135 to 180°.

Further, the brushless motor is mounted in the electric appliance and a vehicle.

DESCRIPTION OF EMBODIMENTS

In a first invention, a brushless motor comprising a rotor having a plurality of poles, a stator having a plurality of slots and making three-phase connection to the slots, and a driving circuit for applying three-phase full-wave current to the stator, characterized in that the ratio of the number of poles on the rotor to the number of slots on the stator is 10:12 and the conduction width of the driving circuit is set at an electrical angle of 135 to 180°. Thus, it is possible to reduce quintuple and septenary components as well as a tertiary component of line induced voltage and to bring line induced voltage to a sine wave, thereby obtaining low noise and low vibration. Further, since the conduction width of the driving circuit is set at an electrical angle of 135 to 180°, it is possible to reduce fluctuations in current applied to a coil because a three-phase conducting period is provided when phases are switched, and it is possible to reduce torque pulsation, thereby obtaining low noise and low vibration.

In a second invention, a brushless motor comprising a rotor having a plurality of poles, a stator having a plurality of slots and making three-phase connection to the slots, and a driving circuit for applying three-phase full-wave current to the stator, characterized in that the ratio of the number of poles on the rotor to the number of slots on the stator is 10:12 and the driving circuit is a sine-wave driving circuit. In the sine-wave driving circuit, the following driving circuit method is used: voltage applied to a winding is subjected to PWM control according to a difference between a line induced voltage and a power supply voltage, and current applied to the winding is brought close to a sine wave. Thus, current applied to a coil can be brought close to a sine wave. Moreover, since the ratio of the number of poles on the rotor to the number of slots on the stator is 10:12, line induced voltage can be brought close to a sine wave and torque pulsation can be reduced, thereby obtaining low noise and low vibration.

In a third invention, a brushless motor comprising a rotor having a plurality of poles, a stator having a plurality of slots and making three-phase connection to the slots, and a driving circuit for applying three-phase full-wave current to the stator, characterized in that the ratio of the number of poles on the rotor to the number of slots on the stator is 10:12 and the conduction width of the driving circuit is set at an electrical angle of 150°. Hence, it is possible to bring line induced voltage close to a sine wave and to bring current applied to a winding close to a sine wave, thereby obtaining low noise and low vibration.

A fourth invention is the brushless motor of the third invention, characterized in that the conduction width of the driving circuit is set at an electrical angle of 150°, current applied to phase coils is expressed as a first value during an overlapping period when adjacent phase coils of the phase coils enter the same current-carrying state, and the current is expressed as a second value in a period other than the overlapping period. Thus, current applied to a winding can be closer to a sine wave as compared with the third invention, thereby obtaining low noise and low vibration.

A fifth invention is the brushless motor of the fourth invention characterized in that the ratio of the first value and the second value is sin $(\pi/3)$:1 (approximately 0.866:1). It is possible to reduce noise and vibration most effectively at 150° current application.

A sixth invention is the brushless motor according to any one of the first to fifth inventions, the brushless motor comprising a rotor having a plurality of poles, a stator having a plurality of slots and making three-phase connection to the slots, and a driving circuit for applying three-phase full-wave current to the stator, characterized in that the ratio of the number of poles on the rotor to the number of slots on the stator is 10:12, the conduction width of the driving circuit is set at an electrical angle of 135 to 180°, and the driving circuit is mounted in the motor. Thus, it is possible to obtain low noise, low vibration, and a small size.

A seventh invention is the brushless motor according to any one of the first to sixth inventions, characterized in that the rotor has a structure of a permanent magnet embedded type. Thus, the ratio of the number of poles on the rotor to the number of slots on the stator is 10:12 while a quantity of magnetic flux is increased on the magnet, so that line induced voltage can be brought close to a sine wave and current applied to a winding can be brought close to a sine wave, thereby obtaining high efficiency in addition to low noise and low vibration.

An eighth invention is an electric appliance equipped with the brushless motor according to any one of the first to seventh inventions, the electric appliance being characterized by reducing resonance with the main body of the electric appliance during an operation of the brushless motor.

A ninth invention is a vehicle equipped with the brushless motor according to any one of the first to seventh inventions, the vehicle being characterized by reducing resonance with the main body of the vehicle during an operation of the brushless motor. It is possible to obtain low noise and low vibration during the operation.

The following will discuss embodiments of the present invention in accordance with the drawings.

Embodiment 1

Figure 1:
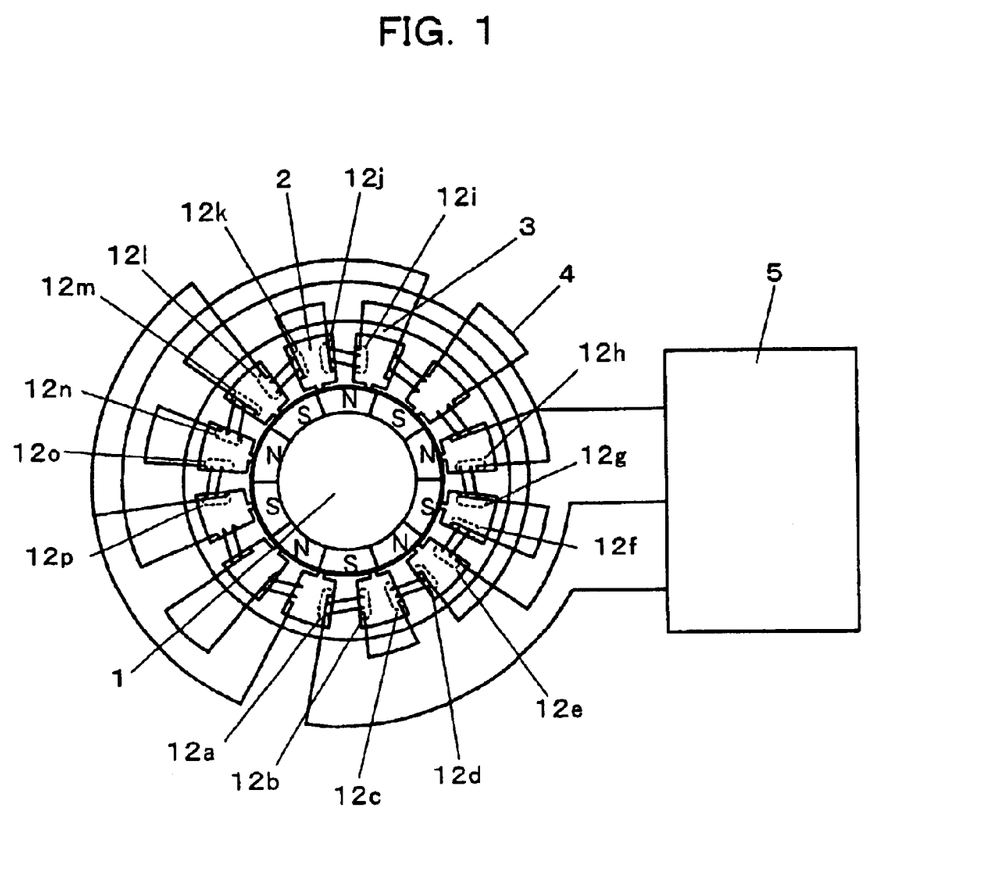
FIG. 1 is a diagram showing a sine-wave driving brushless motor according to an embodiment of the present invention.

FIG. 1 shows a brushless motor which comprises a ten-pole rotor 1 having north pole permanent magnets and south pole permanent magnets alternately disposed, a stator 3 having 12 slots 2 and making three-phase connection to the slots 2, and a driving circuit 5 for applying three-phase full-wave current to the stator 3. Stator windings of a U phase, a V phase, and a W phase are wound around the stator. Each of the phases is composed of four windings, and the windings in a pair are opposed to each other.

Voltage $f_{10}(\theta)$, which is induced by a conductor group 12a on one side of one tooth, is expressed below by Fourier expansion.

$$f_{10}(\theta) = \sum_{n=1}^{\infty} b_n \sin\{(2n-1)\theta\} \qquad \text{(Equation 4)}$$

In the above equation, θ represents an electrical angle (°).

A line induced voltage $f_{10}(\theta)$ is the sum of voltages induced by conductor groups 12a to 12p and is obtained by adding 16 phase differences of the (equation 4) as shown below.

$F_{10}(\theta)=2f_{10}(\theta)+4f_{10}(\theta+30°)+4f_{10}(\theta+60°)+4f_{10}(\theta+90°)+2f_{10}(\theta+120°)$ (Equation 5)

The equation (5) is expressed for each high-frequency component as shown below.

$F_{10}(\theta)=12.93b_1\sin(\theta+60°)+0.93b_3\sin(5\theta+120°)+0.93b_4\sin(7\theta+240°)+$ (Equation 6)

Figure 2:
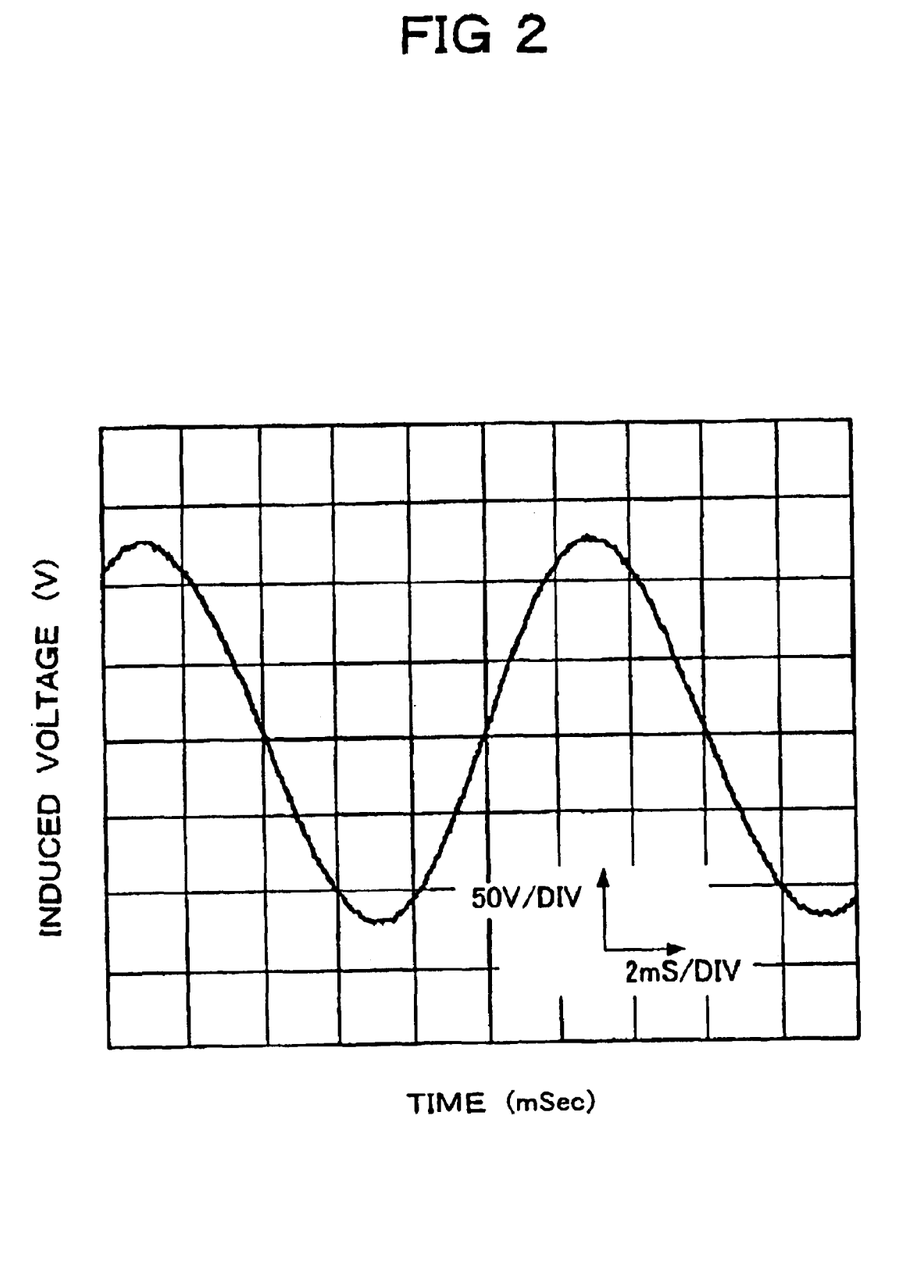
FIG. 2 is a diagram showing a line induced voltage waveform of the sine-wave driving brushless motor according to the embodiment of the present invention.

In this way, in the case of the brushless motor in which the ratio of the number of poles on the rotor to the number of slots on the stator is 10:12, it is possible to reduce quintuple and septenary components as well as a tertiary component of line induced voltage. FIG. 2 shows a line induced voltage waveform at 1000 r/min. It is possible to obtain a sine wave with a distortion factor decreasing to 0.7% so as to reduce torque pulsation, thereby obtaining low noise and low vibration.

Further, the conduction width of the driving circuit is set at an electrical angle of 135 to 180°. Thus, a three-phase conducting period is provided when phases are switched, so that it is possible to reduce fluctuations in current applied to a coil so as to reduce torque pulsation, thereby obtaining low noise and low vibration.

Furthermore, the driving circuit is formed as a sine-wave driving circuit. Thus, current applied to the coil is brought close to a sine wave, so that noise and vibration can be further reduced.

Besides, the conduction width of the driving circuit 5 is set at an electrical angle of 150°. Hence, it is possible to bring line induced voltage close to a sine wave and to bring current applied to a winding close to a sine wave, thereby obtaining low noise and low vibration.

Additionally, current applied to phase coils is expressed as a first value during an overlapping period when adjacent phase coils of the phase coils enter the same current-carrying state, and the current is expressed as a second value in a period other than the overlapping period. Thus, current applied to a winding can be brought closer to a sine wave as compared with the third invention, thereby obtaining low noise and low vibration.

Further, the ratio of the first value and the second value is $\sin(\pi/3):1$ (approximately 0.866:1). It is possible to reduce noise and vibration most effectively at 150° current application.

Embodiment 2

Figure 3:
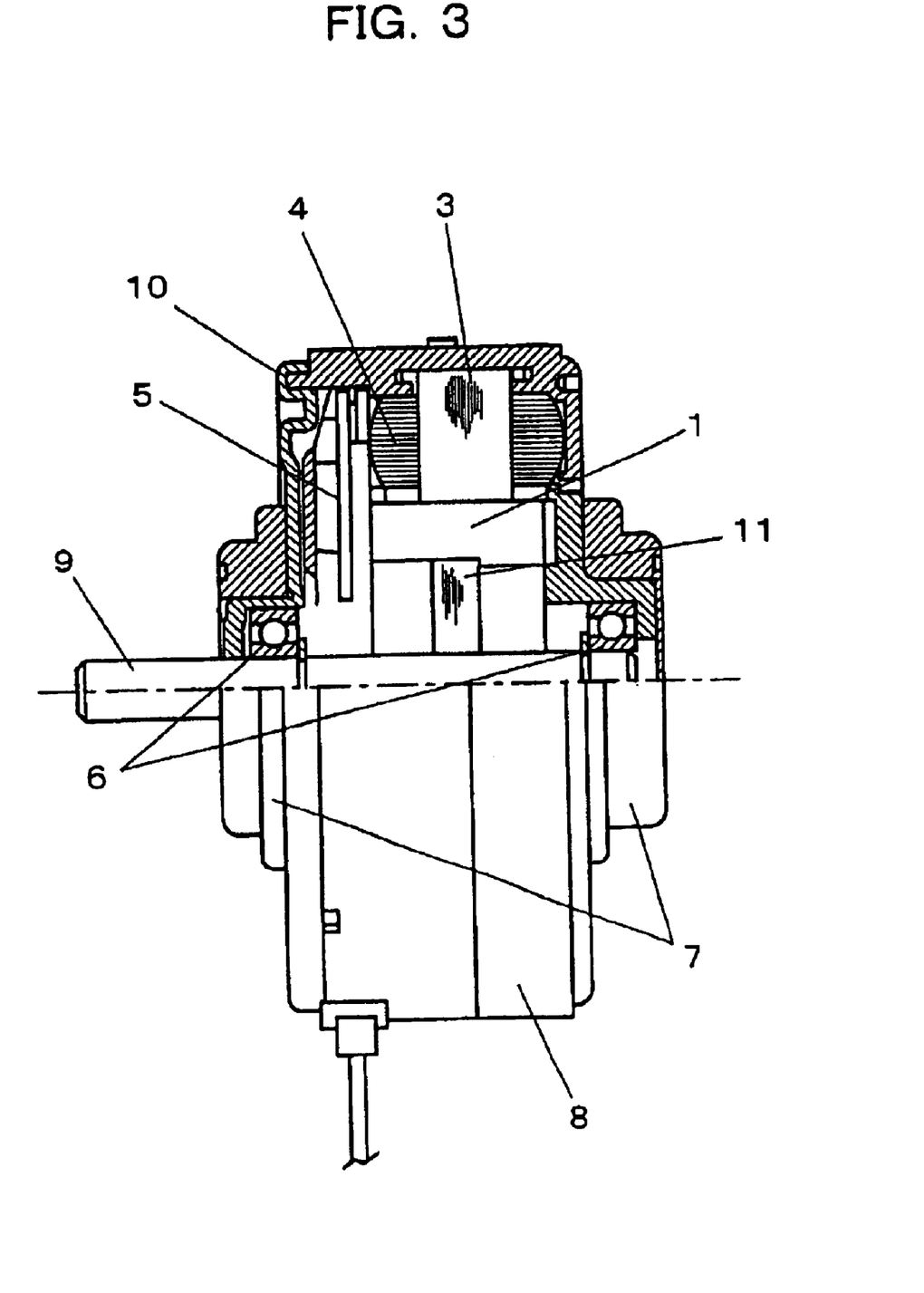
FIG. 3 is a structural sectional view showing a sine-wave driving brushless motor according to an embodiment of the present invention.

FIG. 3 is a structural sectional view showing a sine-wave driving brushless motor according to an embodiment of the present invention. Reference numeral 1 denotes a rotor, reference numeral 3 denotes a stator making three-phase connection to slots, reference numeral 4 denotes a winding, reference numeral 5 denotes a driving circuit for applying three-phase full-wave current to the stator 3, reference numeral 6 denotes a bearer, reference numeral 7 denotes rubber vibration isolators, reference numeral 8 denotes mold resin, reference numeral 9 denotes a shaft, reference numeral 10 denotes a bracket, and reference numeral 11 denotes a rotor core. In the present embodiment, the sine-wave driving circuit 5 is mounted in the motor. The size can be reduced by integrating the motor and the circuit.

Embodiment 3

Figure 4:
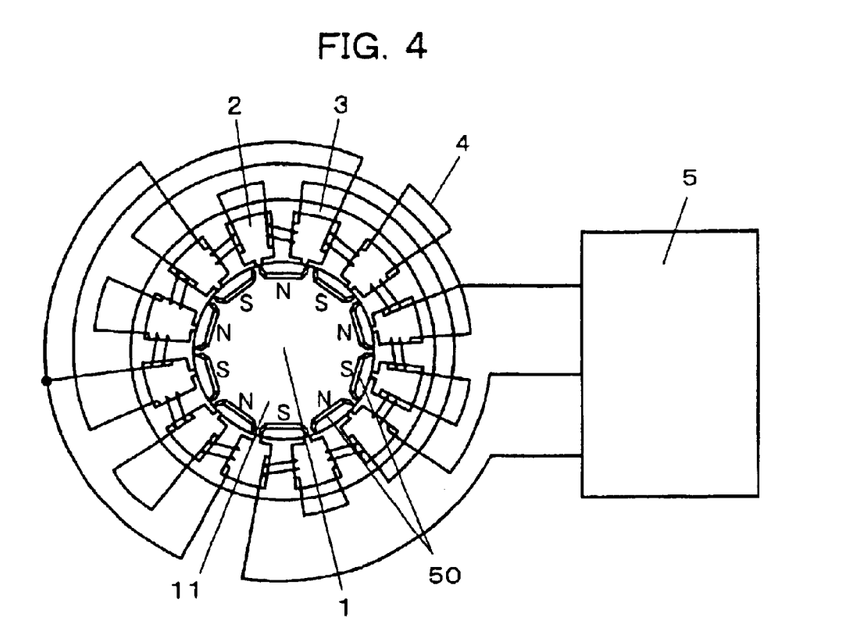
FIG. 4 is a diagram showing a brushless motor employing a rotor of a permanent magnet embedded type according to an embodiment of the present invention.

FIG. 4 shows a brushless motor which comprises a ten-pole rotor 1 having a permanent magnet embedded rotor structure, in which north pole and south pole magnets 50 are alternately disposed on a rotor core 11, a stator 3 having 12 slots 2 and making three-phase connection to the slots 2, and a driving circuit 5 for applying three-phase full-wave current to the stator 3. Since the rotor structure is the permanent magnet embedded type, the ratio of the number of poles on the rotor to the number of slots on the stator is 10:12 while a quantity of magnetic flux is increased on the magnet, so that it is possible to bring line induced voltage close to a sine wave and to bring current applied to a winding to a sine wave, thereby obtaining high efficiency in addition to low noise and low vibration.

Embodiment 4

Figure 5:
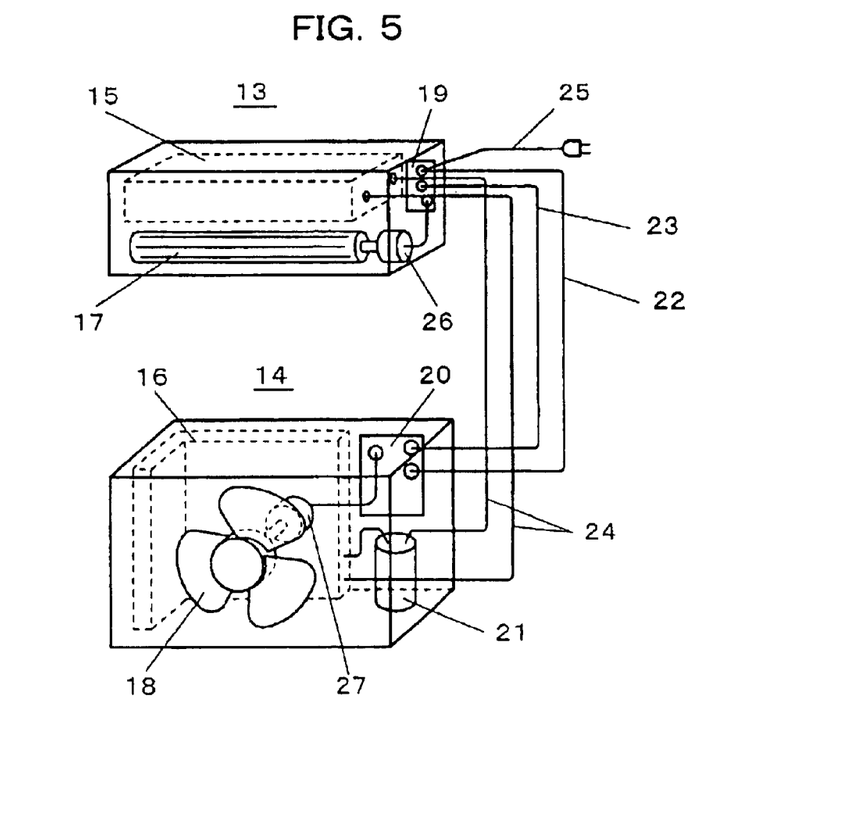
FIG. 5 is a block diagram showing the a structure of an indoor unit and an outdoor unit of an air conditioner according to an embodiment of the present invention.

An indoor unit 13 and an outdoor unit 14 in an air conditioner of FIG. 5 are equipped with motors of the fourth invention. In the indoor unit 13, a cross flow fan 17 is mounted on a motor 26 for blowing. In the outdoor unit 14, a propeller fan 18 is mounted on a motor 27 for blowing air onto a heat exchanger 16. These fan motors are also operated when the air conditioner is operated. Besides, in FIG. 5, reference numeral 15 denotes a heat exchanger for the internal device, reference numeral 16 denotes a heat exchanger for the external device, reference numerals 19 and 20 denote controllers, reference numeral 21 denotes a compressor, reference numeral 22 denotes a power supply line, reference numeral 23 denotes a signal line, reference numeral 24 denotes a refrigerant pipe, and reference numeral 25 denotes a power supply input line.

In this way, when the present invention is used for a fan motor of an air conditioner, it is possible to reduce resonance on the fans and main bodies of the units during an operation of the air conditioner, thereby obtaining low noise and low vibration.

Embodiment 5

Figure 6A:
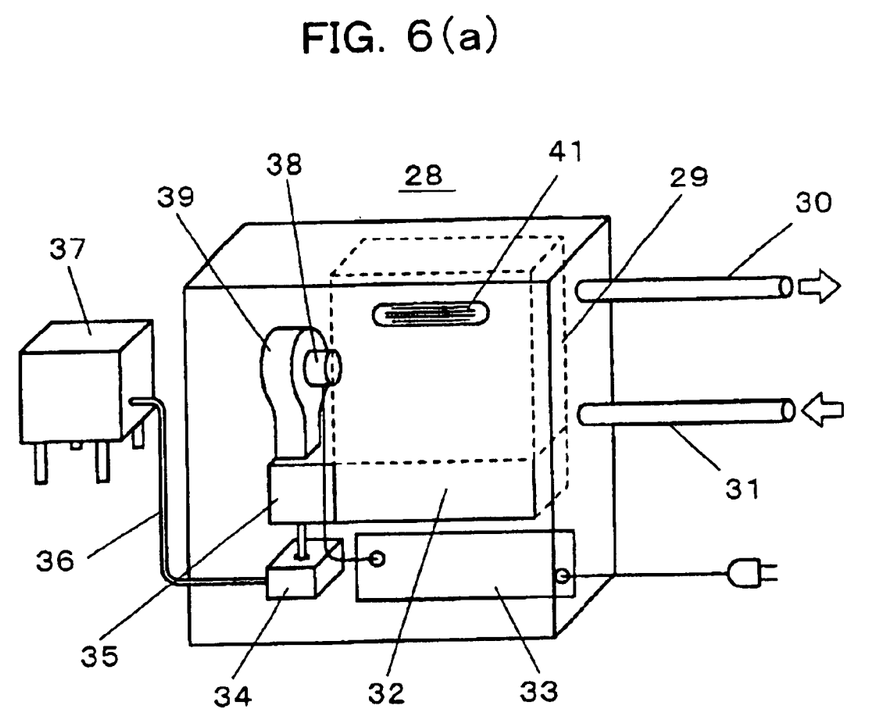
FIG. 6a is a block diagram showing a structure of an air cleaner according to an embodiment of the present invention.
Figure 6B:
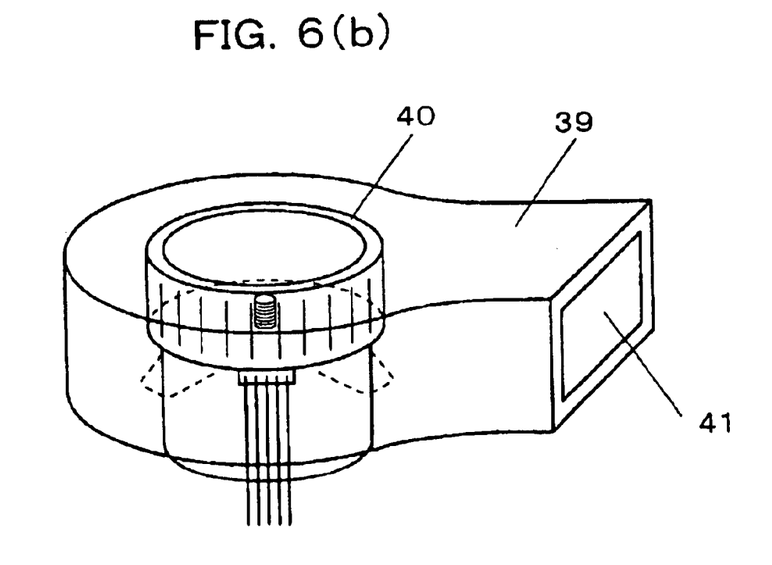
FIG. 6b is another block diagram showing the structure of the air cleaner according to the embodiment of the present invention.

A water heater 28 of FIG. 6a is equipped with a motor of the fourth invention as a blowing fan motor 38 for supplying air required for burning. A multiblade fan 40 of FIG. 6b is mounted on the blowing fan motor 38. Besides, in FIG. 6a, reference numeral 30 denotes a hot water pipe, reference numeral 31 denotes a water pipe, reference numeral 32 denotes a burner, reference numeral 33 denotes a control section, reference numeral 34 denotes a fuel pump, reference numeral 35 denotes a carburetor, reference numeral 36 denotes a fuel pipe, and reference numeral 37 denotes a fuel tank. In FIG. 6b, reference numeral 39 denotes a casing, and reference numeral 41 denotes an exhaust port.

In Embodiment 5 as well, it is possible to reduce resonance of the fan and the main body of the appliance during an operation of the water heater, thereby obtaining low noise and low vibration.

Embodiment 6

Figure 7A:
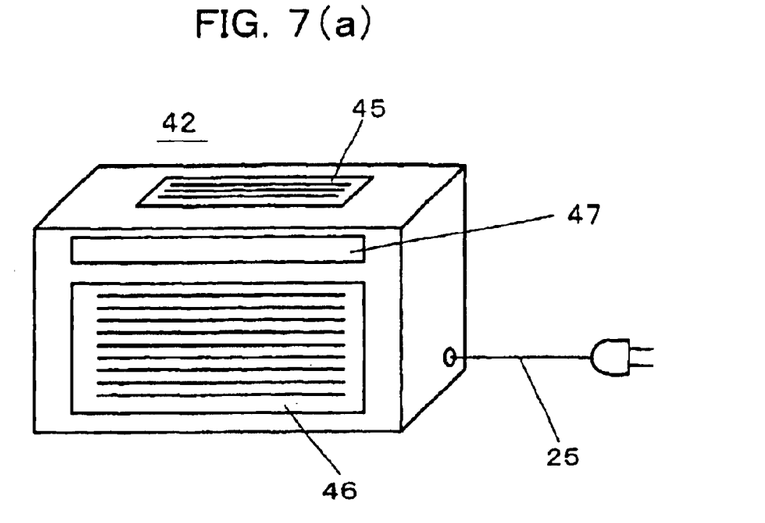
FIG. 7a is a block diagram showing a structure of a water heater according to an embodiment of the present invention.
Figure 7B:
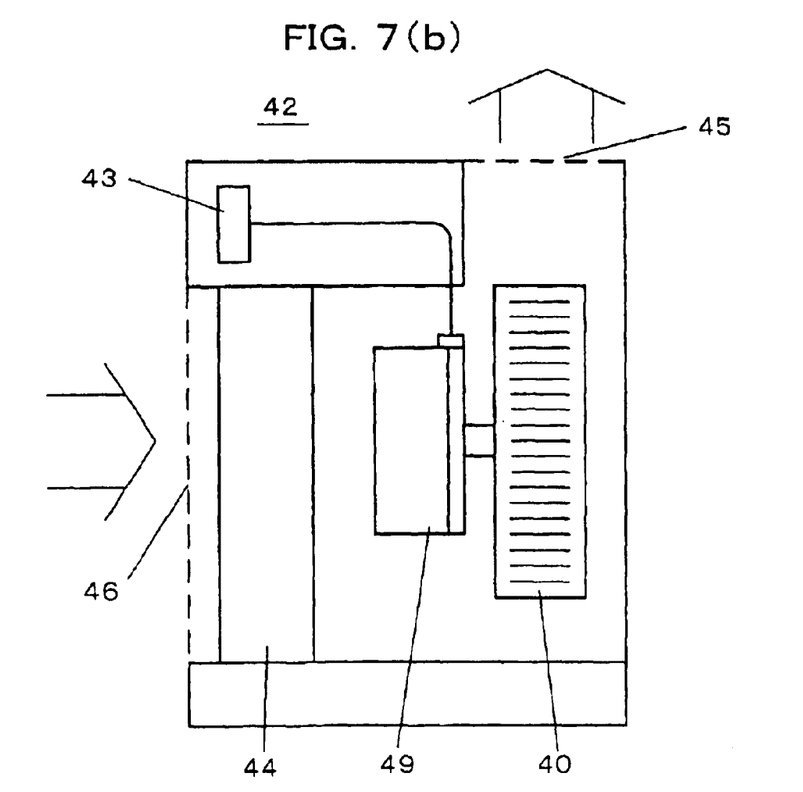
FIG. 7b is another block diagram showing the structure of the water heater according to the embodiment of the present invention.

Further, an air cleaner 42 of FIGS. 7a and 7b is equipped with a motor of the fourth invention as a blowing motor. A multiblade fan 40 is mounted on a blowing motor 49 of the air cleaner. In FIGS. 7a and 7b, reference numeral 43 denotes a control plate, reference numeral 44 denotes an air filter, reference numeral 45 denotes an exhaust port, reference numeral 46 denotes an inlet port, and reference numeral 47 denotes an operating plate. In Embodiment 6 as well, it is possible to reduce resonance of the fan and the main body of the appliance during an operation of the air cleaner, thereby obtaining low noise and low vibration.

Additionally, the present invention is not limited to the above embodiments. In other uses, the present invention can be mounted as a fan motor of an air conditioner for a vehicle where quietness: in a room is demanded, a fan motor for cooling a radiator, and a motor for driving an electric bicycle.

As described above, according to the first invention, line induced voltage can be closer to a sine wave as compared with a brushless motor in which the ratio of the number of poles on a rotor to the number of slots on a stator is 2:3. Further, the conduction width of the driving circuit is set at an electrical angle of 135 to 180°, so that it is possible to reduce fluctuations in current applied to a coil because a three-phase conducting period is provided when phases are switched, and torque pulsation is reduced, thereby obtaining low noise and low vibration.

Moreover, according to the second invention, the driving circuit is formed as a sine-wave driving circuit. Hence, the following driving circuit method is used: voltage applied to a winding is subjected to PWM control according to a difference between a line induced voltage and a power supply voltage, and current applied to the winding is brought close to a sine wave. Thus, current applied to a coil can be brought close to a sine wave. Moreover, since the ratio of the number of poles on the rotor to the number of slots on the stator is set at 10:12, line induced voltage can be brought close to a sine wave and torque pulsation can be reduced, thereby obtaining low noise and low vibration.

Besides, according to the third invention, the conduction width of the driving circuit is set at an electrical angle of 150°. Hence, line induced voltage can be brought close to a sine wave and current applied to a winding can be brought close to a sine wave, thereby obtaining low noise and low vibration.

Also, according to the fourth invention, the conduction width of the driving circuit is set at an electrical angle of 150°, power applied to phase coils is expressed as a first value during an overlapping period when adjacent phase coils of the phase coils enter the same current-carrying state, and the power is expressed as a second value in a period other than the overlapping period. Thus, current applied to a winding can be closer to a sine wave, thereby achieving a brushless motor with lower noise and lower vibration.

In addition, according to the fifth invention, the ratio of the first value and the second value is sin $(\pi/3):1$ (approximately 0.866:1). It is possible to obtain a brushless motor which has the lowest noise and vibration at 150° current application.

Further, according to the sixth invention, the ratio of the number of poles on the rotor to the number of slots on the stator is 10:12, a conduction width of the driving circuit is set at an electrical angle of 135 to 180°, and the driving circuit is mounted in the motor. Thus, it is possible to obtain a brushless motor which can bring line induced voltage to a sine wave, reduce fluctuations in current applied to the coil by the driving circuit, and reduce torque pulsation with low noise, low vibration, and a small size.

Moreover, according to the seventh invention, since the rotor has the permanent magnet embedded structure, the ratio of the number of poles on the rotor to the number of slots on the stator is 10:12 while a quantity of magnetic flux is increased on the magnet, so that line induced voltage can be brought close to a sine wave and current applied to a winding can be brought close to a sine wave. Besides, the conduction width of the driving circuit is set at an electrical angle of 135 to 180°, so that it is possible to reduce fluctuations in current applied to the coil, thereby obtaining high efficiency in addition to low noise and low vibration.

In general, when the rotor has the permanent magnet embedded structure, a magnetic flux between poles is larger than that of a rotor with a surface magnetic structure in a gap magnetic flux distribution between the rotor and the stator. Thus, line induced voltage has a poor distortion factor. Hence, in a conventional brushless motor in which the ratio of the number of poles on the rotor to the number of the slots on the stator is 2:3, line induced voltage has a poor distortion factor. The brushless motor is more efficient than a rotor with a surface magnet structure but is larger in noise and vibration. However, since the ratio of the number of poles on the rotor to the number of slots on the stator is 10:12, it is possible to reduce quintuple and septenary components as well as a tertiary component of line induced voltage and to bring line induced voltage to a sine wave, thereby obtaining low noise and low vibration.

Furthermore, according to the eighth and ninth inventions, it is possible to reduce resonance on the main body of an electric appliance or the main body of a vehicle, thereby reducing low noise and low vibration.

What is claimed is:

1. A brushless motor, comprising a rotor having a plurality of poles, a stator having a plurality of slots therein, and a three-phase connection to a phase coil located in each slot, and a driving circuit for applying three-phase full-wave current to the connection, wherein a ratio of the number of poles on the rotor to the number of slots on the stator is 10:12, and an electrical angle of a conduction width of the driving circuit is from 135° to 180° for reducing fluctuations in current applied to a coil and to reduce torque pulsation.

2. The brushless motor according to claim 1, wherein the driving circuit is a sine-wave driving circuit for permitting voltage applied to a phase coil to be subjected to PWM control, and to cause a wave form of current applied to the phase coil to approximate a sine wave.

3. The brushless motor according to claim 1, wherein the electrical angle of the conduction width of the driving circuit is 150° thereby causing a wave form of current applied to a phase coil to approximate a sine wave.

4. The brushless motor according to claim 3, wherein a conduction width of the driving circuit is an electrical angle of 150°, and the driving circuit is for applying current to phase coils, such current expressed as a first value during an overlapping period when adjacent phase coils enter the same current-carrying state, and the current is expressed as a second value in a period other than the overlapping period.

5. The brushless motor according to claim 4, wherein a ratio of the first value and the second value is sin $(\pi/3):1$.

6. The brushless motor according to claim 1, wherein the driving circuit is mounted in the motor.

7. The brushless motor according to claim 1, wherein the rotor comprises an embedded permanent magnet structure.

8. An electric appliance, comprising the brushless motor according to claim 1.

9. A vehicle, comprising the brushless motor according to claim 1.

* * * * *